Patented Sept. 19, 1939

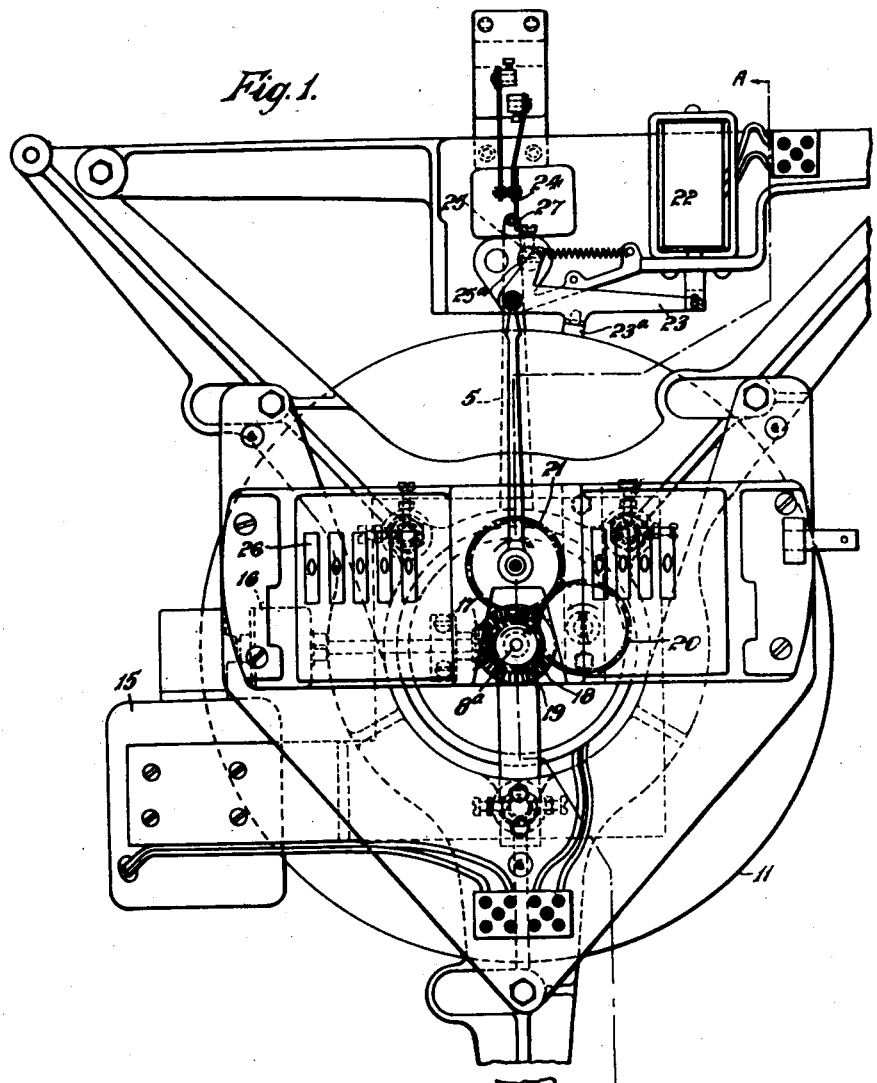
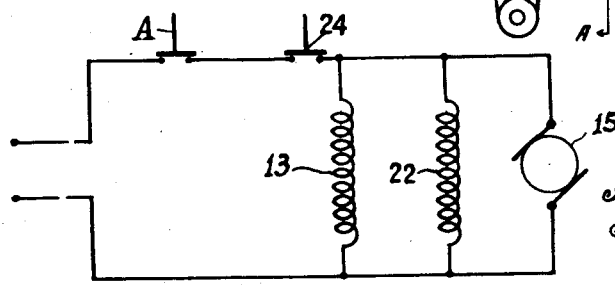

2,173,575

UNITED STATES PATENT OFFICE 2,173,575

INDICATING MECHANISM

Arthur Binns, Birmingham, England, assignor to W. & T. Avery Limited, Birmingham, England Application October 6, 1936, Serial No. 104,249
In Great Britain July 28, 1936

5 Claims. (Cl. 172—239)

This invention has reference to improvements in indicating mechanism, and is more particularly concerned with indicating mechanism of the kind having a member which during an indicating operation is displaced to an amount proportional to the force or load applied to the mechanism.

Indicating mechanism of this kind is sometimes associated with weighing apparatus and where it is desired to associate a complementary mechanism which may be power driven it is advisable that this association should not affect the sensitivity of the weight indicating mechanism, and one of the objects of the present invention is to achieve this purpose.

The invention consists of an improved indicating mechanism of the kind hereinbefore referred to, wherein the disconnection of the movable secondary member from the movable primary member at the completion of an indicating operation results in the bringing into operation of a power driven mechanism which effects the prescribed operation of the complementary mechanism as will hereinafter more clearly appear.

The invention further resides in an indicating mechanism of the kind referred to, in which the secondary member is associated with the weight indicating member of an automatic weight indicating mechanism, said secondary member moving coincident with the weight indicating member during a weighing operation, the secondary member being disconnected from the weighing mechanism at the completion of the weighing operation, said disconnection bringing into action automatically a power driven mechanism which effects the operation of the complementary mechanism, the power driven mechanism remaining operative until the return of the secondary member to the initial position.

One means of carrying the invention into effect will now be described in its application to a complementary mechanism in the form of a weight totalising unit employed in association with an automatic weight indicating mechanism of known kind.

This illustration of the invention is shown in the accompanying drawings, in which:

Figure 1 is an elevation of the mechanism viewed on the face in which the totalising unit is mounted, that is, on the opposite face to that of the weight indicator.

Figure 3 is a conventionalised diagram of the electrical circuit.

Figure 2:
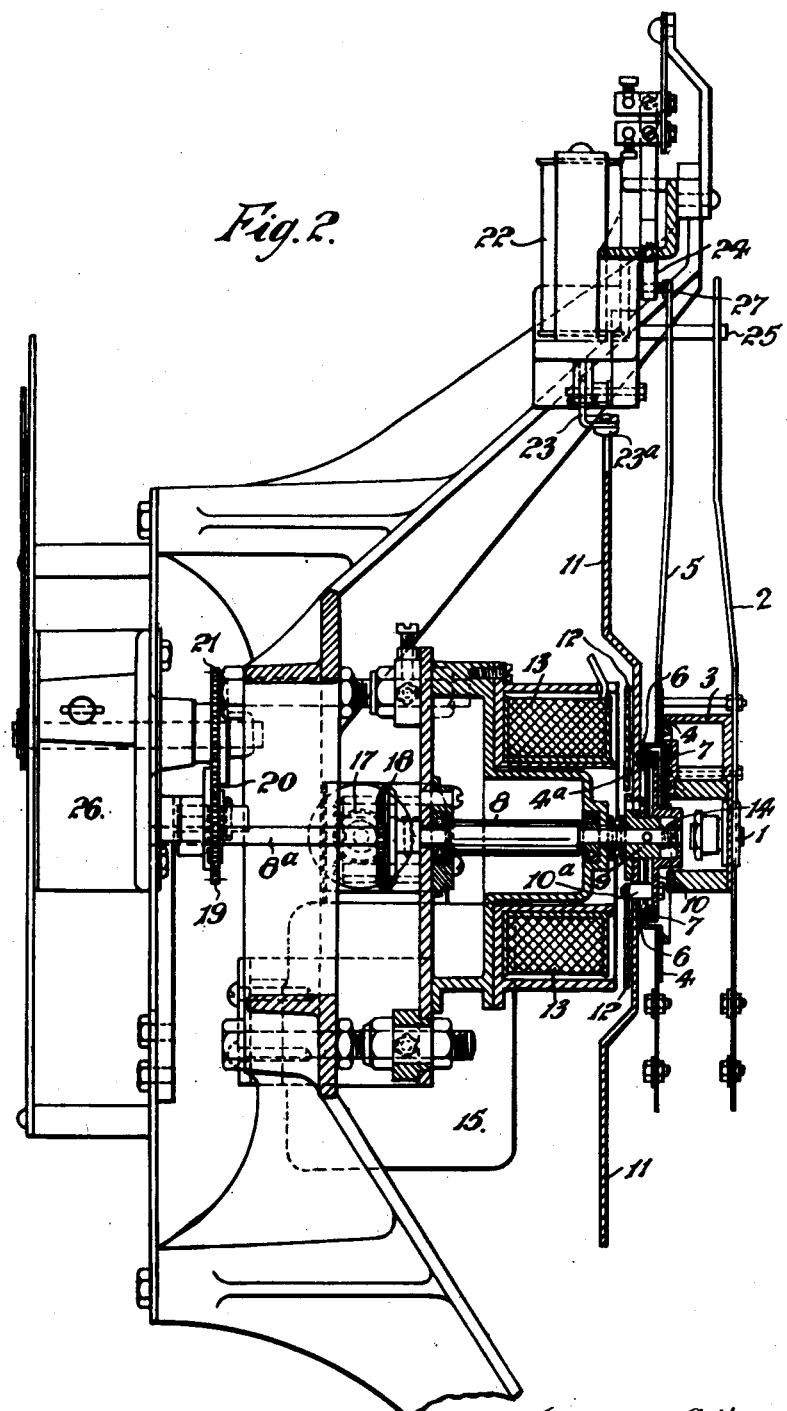
Figure 2 is a part sectional elevation on line AA of Figure 1.

According to the illustrated embodiment of this invention the spindle 1 has mounted thereon a weight indicating pointer 2 which carries a permanent magnet 3 having pole pieces which co-operate with an armature 4 carried by a secondary pointer 5 which is mounted to admit of a free rotation co-axial with the axis of the spindle 1. The armature 4 is provided with a centrally disposed recessed annular portion 4a which co-operates with clutch faces 6 and 7 disposed on each side of the said recessed portion 4a. The clutch face 6 is carried by a disc 11 which is fixed to the driving shaft 8 through the medium of the hub 9. The other clutch face 7 is carried by a recessed flanged disc 10 which constitutes a longitudinally displaceable member adapted to slide over the peripheral surface of the hub 9. Interposed between the recessed portion of the disc 10 and the outer end of the hub 9 is a coil spring 14 which tends to move the disc 10 away from the hub so as to disengage the clutch face 7 from the recessed portion of the armature disc 4 associated with the secondary pointer 5. Pinned to the annular flange of the disc 10 by means of the studs 10a is an annular armature 12 forming part of an electro-magnet 13 carried by a fixed portion of the framework of the apparatus, said electro-magnet 13 being concentrically disposed relatively to the axis of the driving shaft 8.

The driving shaft 8 is formed with an extension 8a for connection to the totalising unit 26 which is adapted to be driven through the spur pinions 19, 20 and 21. Rotation of the shaft 8 is effected through the slipping clutch member 16 by means of the bevel pinion 17 and 18 from an electric motor 15. Mounted on the outer extremity of the secondary pointer 5 is a pin 27 which is adapted to contact with the flexible contact breaker 24 when the secondary pointer is returned to its initial or starting position. This contact breaker 24 is in a circuit which includes the electromagnet 13 the electric motor 15 and the brake operating solenoid 22 and when this circuit is broken the drive through the motor ceases. The opening of the circuit through the motor de-energises the solenoid 22 thereby releasing the spring controlled bell crank lever 23 which carries a brake block 23a which comes into contact with the periphery of the brake disc 11, and checks further rotation of the secondary pointer 5. Immediately following the contact made by the pin 27 with the flexible contact breaker 24 the secondary pointer 5 comes into contact with a stop pin 25 which is mounted in an adjustable eccentric bearing 25a so that the stop pin can be set in the required position to ensure an accurate determination of the point at which the electric circuit is broken.

The operation of the mechanism is as follows: In the initial or starting position the secondary pointer 5 is connected to the weight indicating pointer 2 through the permanent magnet 3 attracting the armature disc 4 thereof. Consequently when the weight indicating pointer moves from the zero position, the secondary pointer 5 is coupled thereto. The movement of the secondary pointer 5 from the zero position permits the contact breaker 24 to move to the circuit making position thus completing a portion of the circuit through the electromagnet 13. The completion of the whole of the circuit through the electro-magnet 13 can take place either automatically under the control of a delayed action switch A see Figure 3 which is timed so as to come into operation after a period of time has elapsed sufficient to enable the weighing operation to be completed, i. e. for the mechanism to attain a position of equilibrium, or alternatively this circuit through the electro-magnet 13 is completed by the actuation of a manually operable switch which may also be regarded as the switch A shown in Figure 3. The completion of the circuit through the electro-magnet 13 attracts the annular armature 12, and through the studs 10ª and the disc 10, brings the clutch face 7 into contact with the central annular portion 4ª of the armature 4 associated with the secondary pointer 5 thereby gripping the said annular portion 4ª between the fixed clutch faces 6 and the longitudinally displaceable clutch 7, thus dis-associating the secondary pointer 5 from the weighing pointer 2. Simultaneously the electric motor 15 is brought into operation and caused to effect a rotation of the driving shaft 8 through the medium of the slipping clutch 16 and the bevel pinions 17 and 18 which rotation turns the secondary pointer 5 in a counter direction to that which occurs during the weighing operation, and also rotates the now associated brake disc 11. Simultaneously also the electric motor 15 drives the complementary totalising mechanism 26 through the extension shaft 8ª and the spur pinions 19, 20 and 21.

When the secondary pointer 5 reaches the initial or zero position as seen in the drawings, the pin 27 thereon strikes the flexible contact breaker 24 which opens the circuit through the electric motor 15, the opening of this circuit results in the stoppage of the motor. Immediately following this circuit breaking contact the pointer 5 comes to rest against the stop pin 25, while the brake disc 11 which had been associated with the secondary pointer 5 is brought to rest by the release of the brake lever 23 due to the de-energisation of the solenoid 22. The brake disc 11 serves to check any overrun of the rotating mechanism associated with the totalising unit.

When the secondary pointer 5 returns to the zero position the contact breaker 24 opens the circuit through the electromagnet 13 and allows the secondary pointer 5 to move towards the weight indicating pointer 2 under the action of the coil spring 14 and to be re-connected to the said weight indicating pointer by the permanent magnet 3.

It will be appreciated that at each actuation the spindle is rotated an amount in a reverse direction equal to the forward movement of the secondary pointer under the influence of a load and thus the totaliser is moved an amount equivalent to the load.

It will also be appreciated that in the operation of a weight totaliser in the manner hereinbefore described the actuation is effected rapidly and is controlled by a member which is associated with the primary pointer during a weighing operation, but the totaliser mechanism is entirely dis-associated from any weighing part during a weighing operation.

What I claim as my invention and desire to secure by Letters Patent is:

1. An indicating mechanism having a movable indicating pointer which during an indicating operation is displaced to an amount proportionate to the force occasioning the displacement, a secondary pointer mounted for free rotation about the axis of the said indicating pointer, magnetic means which couples the pointers during an indicating operation, a complementary mechanism which is required to be actuated to an extent proportionate to the displacement of the indicating pointers during an indicating operation, an electric motor for performing work on said complementary mechanism, an electro-magnetically operated clutch for disconnecting the secondary pointer from the indicating pointer and for coupling the said secondary pointer to the electric motor after the indicating pointer has attained equilibrium in the indicating position and circuit making and breaking means for the circuit including the electric motor and the electro-magnetic clutch operated by the secondary pointer for completing a portion of the circuit through the electric motor and the electro-magnetic clutch during an indicating operation and for disconnecting the secondary pointer from the motor after the motor has performed work on the aforesaid complementary mechanism proportionate to the movement of the secondary pointer during the indicating operation.

2. An indicating mechanism having a movable indicating pointer which is displaced during an indicating operation to an amount proportionate to the force occasioning the displacement, a secondary pointer mounted for free rotation about the axis of the said indicating pointer, a permanent magnet which couples the pointers during an indicating operation and which always tends to maintain the pointers coupled, a complementary mechanism which is required to be actuated to an extent proportionate to the displacement of the indicating pointers during an indicating operation, an electric motor for performing work on said complementary mechanism and incorporating a rotor shaft, a hub fixed on the rotor shaft of the motor, a disc carried by said hub, a brake surface carried by the disc, an electro-magnet, an armature for said electro-magnet, a movable brake surface operated by said armature and adapted on the energisation of the electro-magnet to clutch the secondary pointer to the aforesaid disc, means for energising the electro-magnet for disconnecting the secondary pointer from the indicating pointer and for clutching the secondary pointer to the disc after the indicating pointer has attained equilibrium in the indicating position and for simultaneously bringing the electric motor into action to perform work on the complementary mechanism and a circuit making and breaking means operated by the indicating pointer for completing a portion of the electric circuit through the electric motor and electro-magnet when the secondary pointer is displaced during an indicating operation and for disconnecting the secondary pointer from the said rotor shaft after the motor has performed work on the complementary mechanism proportionate to the movement of the secondary pointer during the indicating operation.

3. An indicating mechanism having a movable indicating pointer which is displaced during an indicating operation to an amount proportionate to the force occasioning the displacement, a secondary pointer mounted for free rotation about the axis of the said indicating pointer, a permanent magnet which couples the pointers during an indicating operation and which always tends to maintain the pointers coupled, a complementary mechanism and which is required to be actuated to an extent proportionate to the displacement of the indicating pointers during an indicating operation, an electric motor for performing work on said complementary mechanism incorporating a rotor shaft, a hub fixed on the rotor shaft of the motor, a disc carried by said hub, a brake surface carried by the disc, an electro-magnet, an armature for said electro-magnet, a movable brake surface operated by said armature and adapted on the energisation of the electro-magnet to clutch the secondary pointer to the aforesaid disc, means for energising the electro-magnet for disconnecting the secondary pointer from the indicating pointer and for clutching the secondary pointer to the disc after the indicating pointer has attained equilibrium in the indicating position and for simultaneously bringing the electric motor into action to perform work on the complementary mechanism, a circuit making and breaking means operated by the indicating pointer for completing a portion, of the electric circuit through the electric motor and electro-magnet when the secondary pointer is displaced during an indicating operation and for disconnecting the secondary pointer from the said rotor shaft after the motor has performed work on the complementary mechanism proportionate to the movement of the secondary pointer during the indicating operation, and an electro-magnetic brake which co-operates with the disc for bringing the mechanism to rest immediately the secondary pointer returns to its initial position after the prescribed operation of the complementary mechanism.

4. An indicating mechanism comprising a movable primary indicator which during an indicating operation is displaced to an amount proportional to the force occasioning the movement, a secondary indicator mounted for free rotation about the axis of the said primary indicator, magnetic coupling means for the primary and secondary indicators so that the two indicators move together as one unit during an indicating operation, a complementary mechanism to the indicating mechanism which is required to be actuated to an extent proportionate to the displacement of the indicating mechanism during an indicating operation, a driving agency for performing work on said complementary mechanism, an electro-magnetically operated device additional to the aforesaid magnetic coupling means for disconnecting the secondary indicator from the primary indicator and connecting it to the driving agency after the indicators have attained esuilibrium in the indicating position, the said coupling operation involving the bringing into action of the driving agency for performing work on the complementary mechanism and circuit breaking means for entailing the disconnection of the secondary indicator from the driving agency after the said agency has performed work on the said complementary mechanism proportionate to the movement of the secondary indicator during an indicating operation.

5. An indicating mechanism having a movable primary indicator which is displaced during an indicating operation to an amount proportionate to the force occasioning the displacement, a secondary indicator mounted for free rotation about the axis of the said primary indicator, magnetic means for coupling the indicators during an indicating operation, a complementary mechanism which is required to be actuated to an extent proportionate to the displacement of the primary indicator during an indicating operation, an electrically actuated means for performing work on the said complementary mechanism, an electro-magnetically operated device additional to the aforesaid magnetic coupling means for disconnecting the secondary indicator and for coupling the secondary indicator to the electrically actuated means for performing work on the complementary mechanism after the primary indicator has attained equilibrium in the indicating position, circuit making means for bringing the said electrical actuating means into action when disconnection has been effected and circuit breaking means for entailing the disconnection of the secondary indicator from the electrical actuating means after the said means has performed work on the aforesaid complementary mechanism proportionate to the movement of the secondary pointer during the indicating operation.

ARTHUR BINNS.